(12) United States Patent
Salojärvi et al.

(10) Patent No.: US 9,572,303 B2
(45) Date of Patent: Feb. 21, 2017

(54) GROWTH CONTAINER

(71) Applicant: Fiskars Brands Finland Oy Ab, Billnäs (FI)

(72) Inventors: Jouni Salojärvi, Helsinki (FI); Mika Sokka, Tuusula (FI); Petteri Masalin, Helsinki (FI)

(73) Assignee: Fiskars Brands Finland Oy Ab, Billnäs (FI)

( * ) Notice: Subject to any disclaimer, the term of this patent is extended or adjusted under 35 U.S.C. 154(b) by 0 days.

(21) Appl. No.: 13/961,768

(22) Filed: Aug. 7, 2013

(65) Prior Publication Data

US 2014/0041291 A1    Feb. 13, 2014

(30) Foreign Application Priority Data

Aug. 13, 2012  (FI) ...................................... 20125839

(51) Int. Cl.
| | | |
|---|---|---|
| *A01G 9/20* | (2006.01) | |
| *A01G 7/04* | (2006.01) | |
| *A01G 9/02* | (2006.01) | |
| *A01G 9/16* | (2006.01) | |

(52) U.S. Cl.
CPC ................ *A01G 7/045* (2013.01); *A01G 9/02* (2013.01); *A01G 9/16* (2013.01)

(58) Field of Classification Search
CPC ............ A01G 7/045; A01G 9/02; A01G 9/20; A01G 31/02; A01G 9/12; A01G 9/26; A01G 13/04; A01G 13/045
USPC ........................................ 47/29.1, 65.5, 66.6
See application file for complete search history.

(56) References Cited

U.S. PATENT DOCUMENTS

| | | | |
|---|---|---|---|
| D260,134 S | 8/1981 | Bercu | |
| D270,845 S | 10/1983 | Hansen | |
| 4,525,950 A | 7/1985 | Glassman | |
| D283,879 S | 5/1986 | Bussell | |
| 4,850,135 A | 7/1989 | DeMarco | |
| 4,979,332 A | 12/1990 | Nagaya et al. | |
| D357,645 S | 4/1995 | Wang | |
| 6,076,944 A * | 6/2000 | Maranon | ........................ 362/294 |
| D537,753 S | 3/2007 | Belokin | |

(Continued)

FOREIGN PATENT DOCUMENTS

| | | |
|---|---|---|
| CN | 2438320 Y | 7/2001 |
| CN | 201440839 U | 4/2010 |

(Continued)

OTHER PUBLICATIONS

National Board of Patents and Registration of Finland Search report for Finland Application No. 20125839, dated Apr. 21, 2013, 1 page.

(Continued)

*Primary Examiner* — Danielle Clerkley
(74) *Attorney, Agent, or Firm* — Foley & Lardner LLP

(57) ABSTRACT

The invention relates to a growth container (1) comprising: a receptacle (2) with a bottom part (3) having a plant receiving area (4), and a light source (6) for providing light to the plant receiving area (4). In order to obtain conditions optimal for growth, the light source (6) is elongated and arranged centrally in the plant receiving area (4) for being surrounded by plants (5) in the plant receiving area, and for producing light (18) to the growth container (1) at a plurality of different heights (h) above the bottom part.

20 Claims, 2 Drawing Sheets

(56) References Cited

U.S. PATENT DOCUMENTS

| | | | |
|---|---|---|---|
| D596,527 S | 7/2009 | Kertz | |
| D630,124 S | 1/2011 | Connell et al. | |
| 2002/0088176 A1* | 7/2002 | Gergek | 47/79 |
| 2005/0039397 A1 | 2/2005 | Roy | |
| 2008/0236036 A1 | 10/2008 | Feuz | |
| 2010/0008081 A1 | 1/2010 | Canino et al. | |
| 2010/0175318 A1* | 7/2010 | Ahmadi | A01G 7/045 47/66.6 |
| 2011/0094156 A1 | 4/2011 | Edwards et al. | |

FOREIGN PATENT DOCUMENTS

| | | | |
|---|---|---|---|
| CN | 201502923 | 6/2010 | |
| CN | 201742768 | 2/2011 | |
| CN | 202050746 U | 11/2011 | |
| FR | 2554676 | 5/1985 | |
| FR | 2685853 | 7/1993 | |
| FR | 2846513 | 5/2004 | |
| JP | EP 0108362 A1 * | 5/1984 | A01G 7/045 |
| NO | 109589 | 8/1966 | |

OTHER PUBLICATIONS

European Patent Office Official Action for European Application No. 13178233, dated Nov. 19, 2013, 7 pages.

English-language machine translation of CN 201440839, Xiaogan Jieneng Special Lighting & Equipment Co. Ltd. (Apr. 28, 2010).

English-language machine translation of CN 202050746, Univ. of Dezhou (Nov. 30, 2011).

English-language machine translation of CN 2438320, Wei, Fang (Jul. 11, 2001).

English-language translation of Chinese Office Action, Application No. 201310379970.8, Fiskars Brands, Inc., 13 pages (May 5, 2016).

* cited by examiner

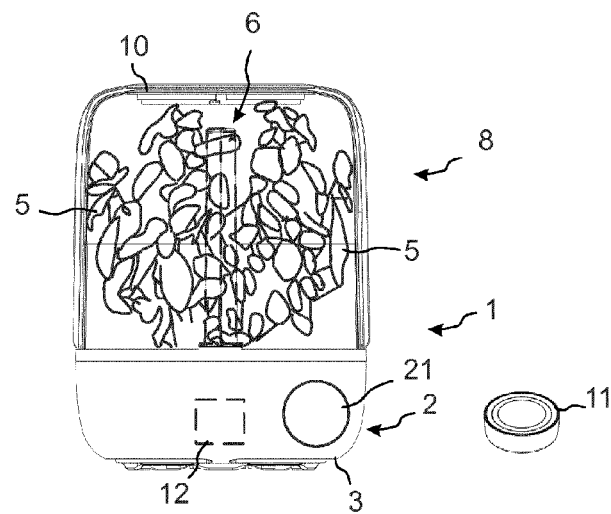
FIG. 1
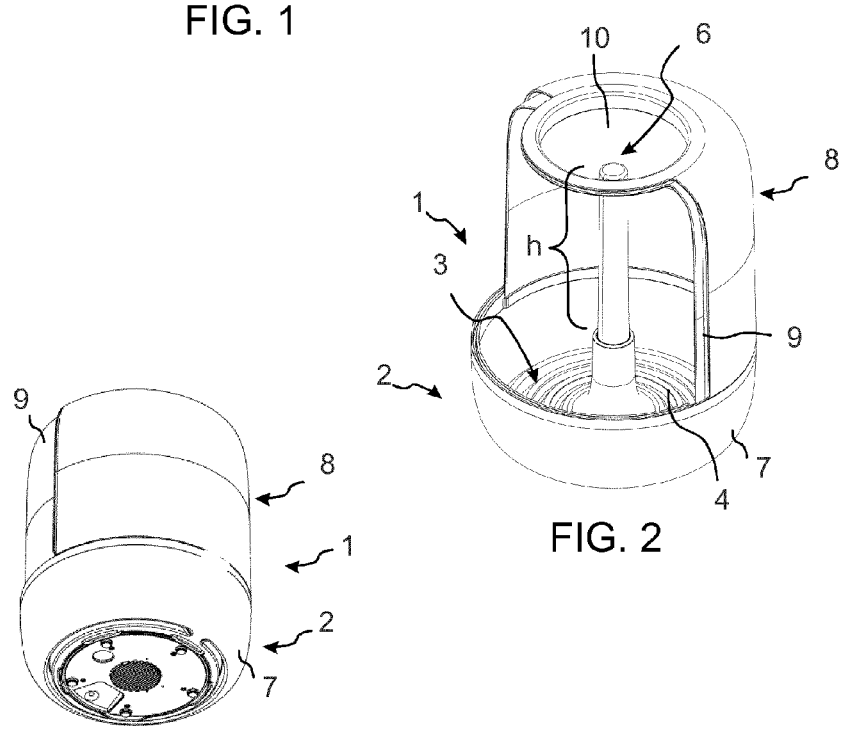
FIG. 2
FIG. 3

GROWTH CONTAINER

CROSS-REFERENCE TO RELATED APPLICATIONS

The present application claims priority to and the benefit of Finnish patent application No. 20125839 entitled "Growth container" and filed on Aug. 13, 2012, the complete disclosure of which is hereby incorporated by reference in its entirety.

FIELD OF THE INVENTION

This invention relates to a growth container which can be used for growing plants indoors or an a balcony, for instance.

DESCRIPTION OF PRIOR ART

Previously there is known a growth container with a receptacle having a bottom part with a plant receiving area. Additionally, the growth container is provided with a light source above the plants in order to ensure that the plants in the plant receiving area receive sufficient light to grow. This light source produces light for the plants from a specific height above the plants, such that the light reaches the plants from above.

A drawback with the known growth container is poor lighting. The light source arranged above the plant does indeed provide sufficient lighting for the uppermost parts of the plants arranged in the growth container. However, the lower parts of the plants are located in the shadow of the uppermost parts of the plants and therefore do not receive sufficient lighting. Additionally, the light source may create a shadow for possible external light and thereby blocking natural light, for instance, from reaching the plant.

SUMMARY OF THE INVENTION

An object of an embodiment of the present invention is to solve the above-mentioned drawback and to provide an improved growth container. This object is achieved with a growth container according to independent claim 1.

The use of a grow container with a light source in the form of an elongated element arranged centrally in the plant receiving area for being surrounded by plants in the plant receiving area, and for providing the growth container with light at a plurality of different heights above the plant receiving area, makes it possible to ensure that all parts of the plants receive sufficient lighting. A light guide in the growth container ensures that light from a plurality of light elements illuminating a part of the light guide efficiently propagates into the growth container.

Preferred embodiments of the invention are disclosed in the dependent claims.

BRIEF DESCRIPTION OF DRAWINGS

In the following the growth container will be described in closer detail by way of example and with reference to the attached drawings, in which FIGS. 1 to 3 illustrate a first embodiment of a growth container.

DESCRIPTION OF AT LEAST ONE EMBODIMENT

Figure 4:
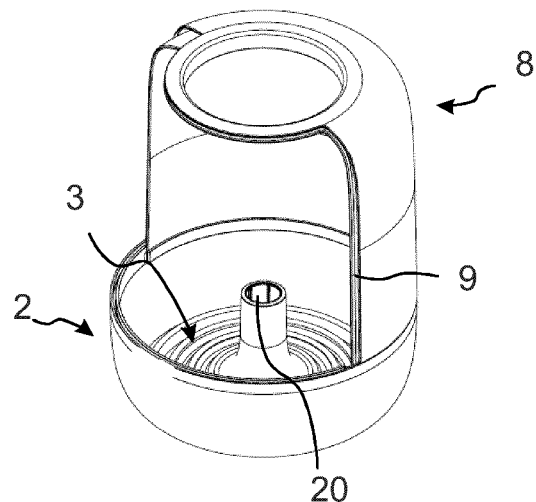
FIGS. 4 to 6 illustrate parts for a growth container.

FIGS. 1 to 3 illustrate a first embodiment of a growth container 1. The growth container 1 comprises a receptacle 2 of plastics, for instance, which has a bottom part 3 with a plant receiving area 4. In the illustrated example the receptacle 2 is provided with side walls 7 that protrude upwards from the bottom part 3. One or more plants 5 may be arranged in the plant receiving area 4. Each such plant 5 may have a pot of its own, for instance. One alternative is that the plants 5 are lettuce or herbs sold to a consumer at a grocery store while they still grow in a pot, and which the consumer stores in the growth container 1 until they are consumed.

The growth container 1 is provided with a light source 6 for providing light to the plant receiving area 4 in order to ensure that plants 5 arranged in the plant receiving area receive light sufficiently. The light source 6 is an elongated element arranged centrally in the plant receiving area 4, where it produces light to the growth container 1 at a plurality of different heights above the bottom part 3. In this connection the term "centrally" refers to a solution where plants can be arranged on different sides of the light source. Therefore, the light source must not necessarily be exactly in the middle of the plant receiving area 4, as in the illustrated example, but instead, it may be arranged at any location where a plurality of plants may surround it. It is also possible that more than one light source is arranged centrally in the plant receiving area, in which case these light sources are each surrounded by plants and together they provide sufficient lighting to all parts of the plants. In case of an embodiment with only one light source 6, the growth container 1 may be manufactured to have a round, circular cross section, in which case light from the light source 6 efficiently reaches all parts of the growth container.

The use of an elongated light source 6 which is centrally located in the plant receiving area 4 and arranged in a substantially upright position to produce light to the growth container 1 at a plurality of different heights h is advantageous, as in that case the plants in the growth container receive sufficient light along their entire height. Therefore, the upper part of the plant 5 does not prevent light from reaching the lower parts of the plant, but instead all parts of the plant receive sufficient lighting. In this connection the term "substantially upright" refers to a solution where the light source is vertically oriented, though it is not necessary that the light source protrudes exactly vertically from the bottom of the receptacle. In FIG. 2 the plurality of different heights where light is produced by the light source 6 is illustrated as a range of heights h where light is produced. From FIG. 2 it can been seen that the light source 6 produces light practically along the entire height of the growth container.

The growth container 1 comprises a cover 8 which together with the receptacle 2 encloses the plants 5 in the growth container 1. The cover 8, which in the illustrated example contacts the walls 7 of the receptacle 2, may be a transparent and clear plastic cover, for instance, in which case the plants 5 in the growth container 1 are clearly visible through the cover. Additionally, the cover may allow external light to reach the plant. Due to the cover 8 the plants 5 in the growth container are protected from excessive draft caused by air circulating in the space around the growth container 1. Additionally, the cover may participate in keeping the temperature suitable within the growth container 1 such that excellent growing conditions may be achieved within the growth container 1. In praxis tests have shown that due to the cover a temperature of about 19 to 21° C., which is excellent for growing lettuce or herbs, for instance, may be achieved within the growth container 1 when the growth container 1 is placed in a room having a temperature of about 21 to 23° C.

Instead of a cover 8 which is clear and transparent, the cover may be implemented as a one-way mirror, in other words such that it reflects back into the growth container 1 light from the light source 6 that reaches the cover while it allows light from the outside to pass through the cover into the growth container. Such a one-way mirror may be implemented by a foil or a layer of a suitable material which is arranged to cover a surface of the cover 8.

The cover 8 may enclose entirely the interior of the growth container 1 from the surrounding environment, in which case the cover is practically air-tight. However, it is also possible to provide the cover 8 with an opening 10 in an upper part of the cover. This may be advantageous if the light source 6 produces too much heat and an excessive rise in temperature within the growth container 1 may occur, or in case it is desirable to ensure efficient exchange of gas (such as air) between the interior of the growth container 1 and the surrounding environment. In the illustrated example the uppermost part of the cover 1, in other words the roof, is provided with an opening 10. A separate lid may be used to close the opening 10 when necessary.

In order to provide the user with an easy access to plants 5 in the growth container 1, the cover 8 is provided with a door 9. In the illustrated example the door is a sliding door, which may be pushed sideways in order to open or close the door 8.

The light source 6 may be provided with light elements of more than one colour. In that case the light source 6 may be set to produce any desired colour of light by adjusting with a controller 12 the mutual intensity of the different light elements. This can be achieved by having at least one red light element, at least one green light element, and at least one blue light element, for instance.

If it is desirable to let also the user decide the colour of light which the light source should produce, the growth container 1 may include a user interface 11 allowing the user to adjust the light provided by the different light elements. In the illustrated example, the user interface 11 is by way of example implemented as a wired or wireless remote control which transmits signals to the controller 12 in the growth container 1 in order to control the controller 12 to adjust the colour of the light from the light source 6 as selected by the user. In case of a wireless implementation, the signals may be transmitted as radio signals or infrared signals, for instance. The growth container may be provided with fixing means 21 for receiving the remote control in order to facilitate simple storage of the remote control while it is not in use. Such fixing means may include a magnet, for instance, so that the remote control with the user interface 11 can easily be attached to and detached from the growth container. This makes it possible for the user to detach the remote control so that the user interface can be used in a more ergonomic position, or to attach the remote control to a refrigerator, for instance, where it can easily be reached once needed.

The light source 6 may include light elements of any previously known type, such as one or more incandescent, fluorescent light, high-intensity discharge lamp, or Light Emitting Diode.

The controller 12 can also be provided with a control function controlling the illumination from the light source in order to obtain optimal growth conditions. This control function of the controller is configured to control the light source to produce light promoting growth only during predetermined time periods which have been predefined in order to obtain optimal growth. Such a controller may be implemented by circuitry alone or as a combination of circuitry and a computer program. The control function may turn off the light source 6 for predetermined periods, for instance, in order to ensure that the lighting conditions are optimal in order to ensure an efficient growth of plants in the growth container.

Additionally, the light source 6 may be provided with light elements of more than one type. One type of light elements may generate light of such a wavelength that cannot be utilized by plants for growing, thus such light does not promote growth. Another type of light elements may, however, be selected such that they specifically provide those wavelengths of light which are useful for plants in order to promote growth. The light source 6 mixes light which does promote growth with light which does not promote growth. An advantage with such mixing is that the colour of the light may be set such that it looks nice for a human. Usually light from light elements promoting growth has such a colour that it is not nice for a human. Plants mainly need light of two different wavelengths. During growth periods plants utilize blue light with a wavelength of about 400 to 480 nm. Red light with a wavelength of about 610 to 680 nm is utilized during flowering and budding. Therefore a red and blue light element is preferably included to promote growth, while additional light elements may be included in order mix the resulting light in such a way that it looks nice for a human.

The controller 12 can control the different types of light elements such that light elements promoting growth are utilized only for predetermined hours (to ensure efficient growth), while during the remaining hours of the day only the light elements not promoting growth are utilized, in case the user decides to switch on the light source during such hours. In this way the light source 6 of the growth container 1 may be utilized as an ordinary lamp or illuminator during those hours when the plants do not need light that promotes growth.

Above it has been referred to more than one controller or control function that carries out control operations relating to the light source of the growth container. In praxis these controllers and control functions can be implemented by one single controller alone, or alternatively, by separated controllers. Each controller may consist of circuitry alone, or of a combination of circuitry and a computer program.

Figure 5:
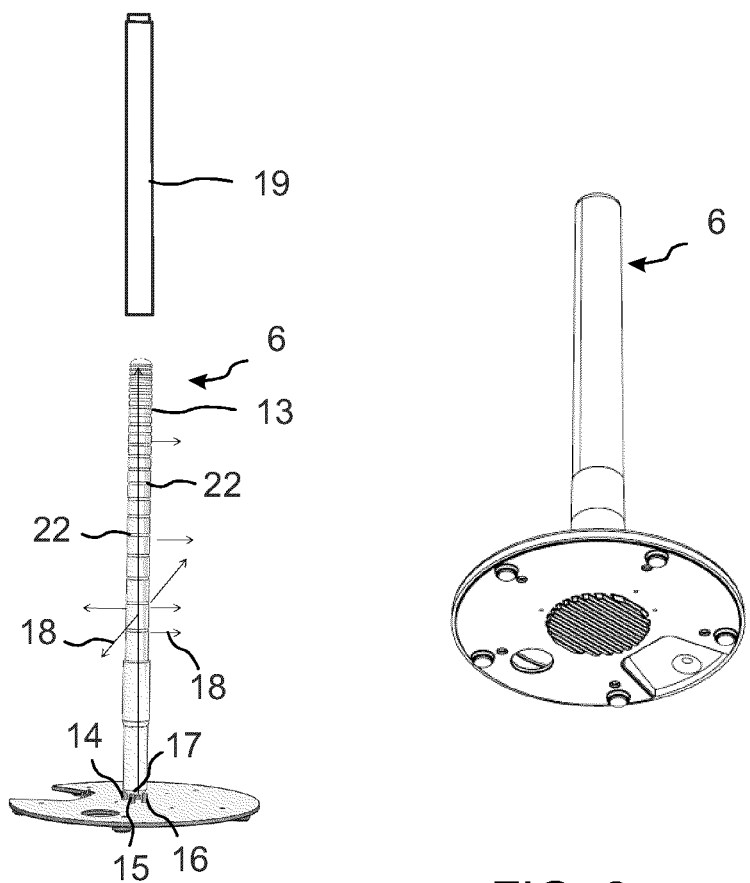
Figure 6:
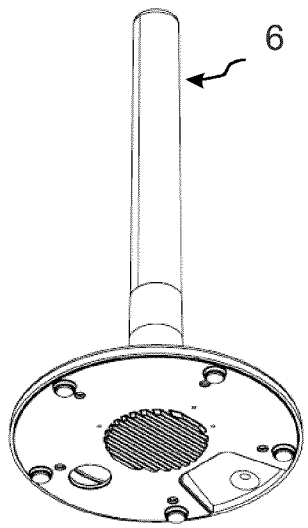

FIGS. 4 to 6 illustrate parts for a growth container. The parts of FIGS. 4 to 6 may be utilized to assemble a growth container 1 as illustrated in FIGS. 1 to 3, for instance.

In the embodiments of FIGS. 4 to 6, the light source 6 comprises a light guide 13 which during use is arranged in the growth container 1. Light elements 14, 15 and 16 are arranged to illuminate a part 17 of the light guide 13 such that the light from the light elements 14, 15 and 16 propagates into the growth container 1 via the light guide 6. Light from different light elements, such as from light elements producing light that promotes growth and from light elements producing light that does not promote growth, may be mixed by the light guide while propagating via the light guide into the growth container. In the illustrated example a red light element 14, a white light element 15, and a blue light element 16 are arranged to illuminate the bottom surface 17 of the cylindrical elongated light guide 13. The previously mentioned colors are just examples of colors that can be used in the growth container. Naturally, light elements of any color may be utilized in order to obtain a desired colour of light.

For simplicity, the electric wires or the switch used for providing electricity to the light elements from the power-distribution network are not shown in the figures. The light guide 13 is of a clear transparent material, such as clear polycarbonate, for instance. Therefore, light from the light elements propagates easily via the light guide 13 into the inside of the growth container 1.

The light guide 13 comprises a plurality of circumferential grooves 22 in an outer surface of the light guide 13. The grooves 22 extend around the light guide 13. Due to the grooves 22, light which propagates through the light guide 13 changes direction at the grooves, and is directed sideways as illustrated by arrows 18. In this way light can efficiently be produced at different heights to plants 5 in the growth container 1. Part of the light propagates horizontally from the light source, however, some of the light propagates upwards and downwards.

In order to obtain a light source with light distribution that is as uniform as possible, a non-clear transparent tube 19 surrounds the light guide 13. FIG. 5 illustrates the light guide 13 and tube 19 separately from each other, and FIG. 6 illustrates the light source once the tube 19 is threaded to cover the light guide 13. The tube may be manufactured of white polycarbonate, for instance.

FIG. 4 illustrates the growth container 1 before mounting of the light source 6. The light source 6 is introduced into the growth container 1 via a hole 20 in the bottom 3 of the growth container 1. The result is a growth container as illustrated in FIGS. 1 to 3.

In the Figures it is by way of example assumed that the light source is arranged to protrude into the growth container from the bottom. However, deviating from this, it is also possible to provide the cover with a roof part to which the light source is mounted. In that case the light source protrudes from the roof towards the bottom of the receptacle. However, also in this case, the elongated light source is arranged centrally in the plant receiving area for being surrounded by plants.

It is to be understood that the above description and the accompanying figures are only intended to illustrate the present invention. It will be obvious to a person skilled in the art that the invention can be varied and modified without departing from the scope of the invention.

The invention claimed is:

1. A growth container comprising:
a receptacle with a bottom part having a plant receiving area, the bottom part having a centrally-arranged hole for receiving a light source, and
a light source for providing light to the plant receiving area, the light source is elongated and arranged centrally in the plant receiving area for being surrounded by plants in the plant receiving area, and for producing light to the growth container at a plurality of different heights above the bottom part, and the light source comprises a light guide in the growth container which has a first end that protrudes through said hole from an outside of the receptacle to an inside of the receptacle, and one or more light elements arranged at a second end of the light guide, outside of the receptacle, to illuminate the second end of the light guide which is located outside of the receptacle such that the light from the light elements propagates through the light guide from the second end, outside of the receptacle, to the inside of the receptacle and into the growth container through the first end of the light guide which protrudes through said hole.

2. The growth container according to claim 1, wherein the growth container comprises a cover which together with the receptacle encloses plants in the growth container.

3. The growth container according to claim 2, wherein the cover comprises an opening in an upper part of the cover.

4. The growth container according to claim 2, wherein the cover comprises a door for providing access to plants in the growth container.

5. The growth container according to claim 1, wherein the elongated light source is arranged in a substantially upright position in the growth container.

6. The growth container according to claim 1, wherein the light source comprises light elements providing light of different colours.

7. The growth container according to claim 6, wherein the growth container comprises a controller and a user interface for adjusting the light provided by the different light elements in order to adjust the colour of the light provided by the light source.

8. The growth container according to claim 7, wherein the user interface is provided on a wired or wireless remote control transmitting signals to the controller in the growth container.

9. The growth container according to claim 1, wherein the light guide is of a clear transparent material, and a non-clear transparent tube surrounds the light guide.

10. The growth container according to 1, wherein a plurality of circumferential grooves are arranged in an outer surface of the elongated light guide to extend around the light guide.

11. The growth container according to claim 1, wherein the light source comprises Light Emitting Diodes.

12. The growth container according to claim 1, wherein the light source comprises light elements producing light that promotes growth and light elements producing light that does not promote growth, and that the light source is configured to mix light promoting growth with light that does not promote growth.

13. The growth container according to claim 1, wherein the light source comprises light elements producing light that promotes growth and light elements producing light that does not promote growth, and that the growth container comprises a controller configured to activate the light elements producing light that promotes growth only during predetermined time periods which have been predefined in order to obtain optimal growth, and to activate the light elements not promoting growth during other time periods if the user switches on the light source during such time periods.

14. The growth container according to claim 1, wherein the growth container comprises a controller configured to control the light source to produce light promoting growth only during predetermined time periods which have been predefined in order to obtain optimal growth.

15. The growth container according to claim 8, wherein the growth container comprises fixing means for receiving and storing the remote control with the user interface.

16. The growth container according to claim 1, wherein the growth container comprises a cover which together with the receptacle encloses plants in the growth container, the cover being implemented as a one-way mirror which reflects back into the growth container light from the light source while allowing light from an outside to pass through the cover into the growth container.

17. A growth container comprising:
a receptacle with a bottom part having a plant receiving area configured to receive plants, the bottom part also having a centrally-arranged hole for receiving a light source, and an elongated light source having a substantially vertical axis and disposed centrally in the plant receiving area, the light source comprising an elongated light guide which has a first end that protrudes through said hole from an outside of the receptacle to an inside of the receptacle, and one or more light elements disposed proximate a second end of the elongated light guide which is located outside of the receptacle such that light from the light elements propagates through the light guide from the second end, outside of the receptacle to the inside of the receptacle through the first end of the light guide which protrudes through said hole, the elongated light guide configured to outwardly direct light from within the light guide to the plant receiving area along a plurality of different heights within the receptacle.

18. The growth container of claim 17 wherein the elongated light guide comprises a plurality of grooves configured to outwardly direct light from the light elements in at least one of a horizontal direction, an upward direction and a downward direction.

19. The growth container of claim 18 wherein the elongated light source further comprises an elongated tube disposed over the elongated light guide, the elongated tube configured to create a substantially uniform distribution of the outwardly directed light from the elongated light guide.

20. The growth container of claim 17 further comprising a cover removably coupled to the bottom part and including a sliding door configured to provide access to plants in the plant receiving area.

* * * * *